United States Patent
Bennett et al.

(10) Patent No.: US 7,127,548 B2
(45) Date of Patent: Oct. 24, 2006

(54) CONTROL REGISTER ACCESS VIRTUALIZATION PERFORMANCE IMPROVEMENT IN THE VIRTUAL-MACHINE ARCHITECTURE

(75) Inventors: Steve Bennett, Hillsboro, OR (US); Andrew V. Anderson, Hillsboro, OR (US); Erik Cota-Robles, Portland, OR (US); Stalinselvaraj Jeyasingh, Portland, OR (US); Alain Kagi, Portland, OR (US); Gilbert Neiger, Portland, OR (US); Richard Uhlig, Hillsboro, OR (US); Michael A. Kozuch, Export, PA (US)

(73) Assignee: Intel Corporation, Santa Clara, CA (US)

( * ) Notice: Subject to any disclaimer, the term of this patent is extended or adjusted under 35 U.S.C. 154(b) by 209 days.

(21) Appl. No.: 10/124,641

(22) Filed: Apr. 16, 2002

(65) Prior Publication Data

US 2003/0217250 A1    Nov. 20, 2003

(51) Int. Cl.
*G06F 12/00* (2006.01)
(52) U.S. Cl. ............................... 711/6; 718/1
(58) Field of Classification Search ............... 718/100, 718/1; 711/6; 700/2
See application file for complete search history.

(56) References Cited

U.S. PATENT DOCUMENTS

| | | | |
|---|---|---|---|
| 3,699,532 A | 10/1972 | Schaffer et al. | |
| 3,996,449 A | 12/1976 | Attanasio et al. | |
| 4,037,214 A | 7/1977 | Birney et al. | |
| 4,162,536 A | 7/1979 | Morley | |
| 4,207,609 A | 6/1980 | Luiz et al. | |
| 4,247,905 A | 1/1981 | Yoshida et al. | 711/166 |
| 4,276,594 A | 6/1981 | Morley | |
| 4,278,837 A | 7/1981 | Best | |
| 4,307,447 A | 12/1981 | Provanzano et al. | |
| 4,319,233 A | 3/1982 | Matsuoka et al. | |
| 4,319,323 A | 3/1982 | Ermolovich et al. | |
| 4,347,565 A | 8/1982 | Kaneda et al. | |
| 4,366,537 A | 12/1982 | Heller et al. | |
| 4,403,283 A | 9/1983 | Myntti et al. | |
| 4,419,724 A | 12/1983 | Branigin et al. | |
| 4,430,709 A | 2/1984 | Schleupen | |
| 4,521,852 A | 6/1985 | Guttag | |
| 4,571,672 A | 2/1986 | Hatada et al. | |
| 4,621,318 A | 11/1986 | Maeda | |
| 4,759,064 A | 7/1988 | Chaum | |
| 4,795,893 A | 1/1989 | Ugon | |

(Continued)

FOREIGN PATENT DOCUMENTS

EP    0600112 A1    6/1994

(Continued)

OTHER PUBLICATIONS

Berg, Cliff, "How Do I Create A Signed Applet?" Dr. Dobb's Journal, Aug. 1997, pp. 1-9.

(Continued)

*Primary Examiner*—Jungwon Chang
(74) *Attorney, Agent, or Firm*—Blakely, Sokoloff, Taylor & Zafman LLP

(57) ABSTRACT

In one embodiment, a command pertaining to one or more portions of a register is received from guest software. Further, a determination is made as to whether the guest software has access to all of the requested portions of the register based on indicators within a mask field that correspond to the requested portions of the register. If the guest software has access to all of the requested portions of the register, the command received from the guest software is executed on the requested portions of the register.

30 Claims, 5 Drawing Sheets

U.S. PATENT DOCUMENTS

| | | | |
|---|---|---|---|
| 4,802,084 A * | 1/1989 | Ikegaya et al. | 711/6 |
| 4,825,052 A | 4/1989 | Chemin et al. | |
| 4,835,677 A | 5/1989 | Sato et al. | |
| 4,907,270 A | 3/1990 | Hazard | |
| 4,907,272 A | 3/1990 | Hazard | |
| 4,910,774 A | 3/1990 | Barakat | |
| 4,975,836 A * | 12/1990 | Hirosawa et al. | 718/100 |
| 5,007,082 A | 4/1991 | Cummins | |
| 5,022,077 A | 6/1991 | Bealkowski et al. | |
| 5,075,842 A | 12/1991 | Lai | |
| 5,079,737 A | 1/1992 | Hackbarth | 711/164 |
| 5,187,802 A * | 2/1993 | Inoue et al. | 718/107 |
| 5,230,069 A * | 7/1993 | Brelsford et al. | 718/100 |
| 5,237,616 A | 8/1993 | Abraham et al. | |
| 5,255,379 A | 10/1993 | Melo | |
| 5,287,363 A | 2/1994 | Wolf et al. | |
| 5,293,424 A | 3/1994 | Holtey et al. | |
| 5,295,251 A * | 3/1994 | Wakui et al. | 718/100 |
| 5,317,705 A | 5/1994 | Gannon et al. | |
| 5,319,760 A | 6/1994 | Mason et al. | |
| 5,339,417 A | 8/1994 | Connell et al. | |
| 5,361,375 A * | 11/1994 | Ogi | 718/100 |
| 5,386,552 A | 1/1995 | Garney | |
| 5,421,006 A | 5/1995 | Jablon et al. | |
| 5,434,999 A | 7/1995 | Goire et al. | |
| 5,437,033 A | 7/1995 | Inoue et al. | |
| 5,442,645 A | 8/1995 | Ugon et al. | |
| 5,455,909 A | 10/1995 | Blomgren et al. | |
| 5,459,867 A | 10/1995 | Adams et al. | |
| 5,459,869 A | 10/1995 | Spilo | |
| 5,469,557 A | 11/1995 | Salt et al. | |
| 5,473,692 A | 12/1995 | Davis | |
| 5,479,509 A | 12/1995 | Ugon | |
| 5,504,922 A | 4/1996 | Seki et al. | |
| 5,506,975 A * | 4/1996 | Onodera | 718/1 |
| 5,511,217 A | 4/1996 | Nakajima et al. | |
| 5,522,075 A | 5/1996 | Robinson et al. | |
| 5,528,231 A | 6/1996 | Patarin | |
| 5,533,126 A | 7/1996 | Hazard | |
| 5,555,385 A * | 9/1996 | Osisek | 711/1 |
| 5,555,414 A * | 9/1996 | Hough et al. | 710/261 |
| 5,560,013 A | 9/1996 | Scalzi et al. | |
| 5,564,040 A | 10/1996 | Kubala | |
| 5,566,323 A | 10/1996 | Ugon | |
| 5,568,552 A | 10/1996 | Davis | |
| 5,574,936 A * | 11/1996 | Ryba et al. | 712/30 |
| 5,582,717 A | 12/1996 | Di Santo | |
| 5,604,805 A | 2/1997 | Brands | |
| 5,606,617 A | 2/1997 | Brands | |
| 5,615,263 A | 3/1997 | Takahashi | |
| 5,628,022 A | 5/1997 | Ueno et al. | |
| 5,633,929 A | 5/1997 | Kaliski, Jr. | |
| 5,657,445 A | 8/1997 | Pearce | |
| 5,668,971 A | 9/1997 | Neufeld | |
| 5,684,948 A | 11/1997 | Johnson et al. | |
| 5,706,469 A | 1/1998 | Kobayashi | |
| 5,717,903 A | 2/1998 | Bonola | |
| 5,720,609 A | 2/1998 | Pfefferle | |
| 5,721,222 A | 2/1998 | Bernstein et al. | |
| 5,729,760 A | 3/1998 | Poisner | |
| 5,737,604 A | 4/1998 | Miller et al. | |
| 5,737,760 A | 4/1998 | Grimmer, Jr. et al. | 711/163 |
| 5,740,178 A | 4/1998 | Jacks et al. | |
| 5,752,046 A | 5/1998 | Oprescu et al. | |
| 5,757,919 A | 5/1998 | Herbert et al. | |
| 5,764,969 A | 6/1998 | Kahle et al. | |
| 5,796,835 A | 8/1998 | Saada | |
| 5,796,845 A | 8/1998 | Serikawa et al. | |
| 5,805,712 A | 9/1998 | Davis | |
| 5,809,546 A | 9/1998 | Greenstein et al. | |
| 5,825,875 A | 10/1998 | Ugon | |
| 5,825,880 A | 10/1998 | Sudia et al. | |
| 5,835,594 A | 11/1998 | Albrecht et al. | |
| 5,844,986 A | 12/1998 | Davis | |
| 5,852,717 A | 12/1998 | Bhide et al. | |
| 5,854,913 A | 12/1998 | Goetz et al. | |
| 5,867,577 A | 2/1999 | Patarin | |
| 5,872,994 A | 2/1999 | Akiyama et al. | |
| 5,890,189 A | 3/1999 | Nozue et al. | |
| 5,900,606 A | 5/1999 | Rigal | |
| 5,901,225 A | 5/1999 | Ireton et al. | |
| 5,903,752 A | 5/1999 | Dingwall et al. | |
| 5,919,257 A | 7/1999 | Trostle | |
| 5,935,242 A | 8/1999 | Madany et al. | |
| 5,935,247 A | 8/1999 | Pai et al. | |
| 5,937,063 A | 8/1999 | Davis | |
| 5,944,821 A | 8/1999 | Angelo | |
| 5,953,502 A | 9/1999 | Helbig, Sr. | |
| 5,956,408 A | 9/1999 | Arnold | |
| 5,970,147 A | 10/1999 | Davis et al. | |
| 5,978,475 A | 11/1999 | Schneier et al. | |
| 5,978,481 A | 11/1999 | Ganesan et al. | |
| 5,987,557 A | 11/1999 | Ebrahim | |
| 6,014,745 A | 1/2000 | Ashe | |
| 6,035,374 A | 3/2000 | Panwar et al. | |
| 6,044,478 A | 3/2000 | Green | |
| 6,055,637 A | 4/2000 | Hudson et al. | |
| 6,058,478 A | 5/2000 | Davis | |
| 6,061,794 A | 5/2000 | Angelo | |
| 6,075,938 A | 6/2000 | Bugnion et al. | |
| 6,085,296 A | 7/2000 | Karkhanis et al. | |
| 6,088,262 A | 7/2000 | Nasu | |
| 6,092,095 A | 7/2000 | Maytal | |
| 6,093,213 A | 7/2000 | Favor et al. | |
| 6,101,584 A | 8/2000 | Satou et al. | |
| 6,108,644 A | 8/2000 | Goldschlag et al. | |
| 6,115,816 A | 9/2000 | Davis | |
| 6,125,430 A | 9/2000 | Noel et al. | |
| 6,131,166 A | 10/2000 | Wong-Insley | |
| 6,148,379 A | 11/2000 | Schimmel | |
| 6,158,546 A | 12/2000 | Hanson et al. | |
| 6,173,417 B1 | 1/2001 | Merrill | |
| 6,175,924 B1 | 1/2001 | Arnold | |
| 6,175,925 B1 | 1/2001 | Nardone et al. | |
| 6,178,509 B1 | 1/2001 | Nardone et al. | |
| 6,182,089 B1 | 1/2001 | Ganapathy et al. | |
| 6,188,257 B1 | 2/2001 | Buer | |
| 6,192,455 B1 | 2/2001 | Bogin et al. | |
| 6,199,152 B1 | 3/2001 | Kelly et al. | |
| 6,205,550 B1 | 3/2001 | Nardone et al. | |
| 6,212,635 B1 | 4/2001 | Reardon | |
| 6,222,923 B1 | 4/2001 | Schwenk | |
| 6,249,872 B1 | 6/2001 | Wildgrube et al. | 713/200 |
| 6,252,650 B1 | 6/2001 | Nakamura | |
| 6,269,392 B1 | 7/2001 | Cotichini et al. | |
| 6,272,533 B1 | 8/2001 | Browne et al. | 709/213 |
| 6,272,637 B1 | 8/2001 | Little et al. | 713/194 |
| 6,275,933 B1 | 8/2001 | Fine et al. | |
| 6,282,650 B1 | 8/2001 | Davis | |
| 6,282,651 B1 | 8/2001 | Ashe | |
| 6,282,657 B1 | 8/2001 | Kaplan et al. | |
| 6,292,874 B1 | 9/2001 | Barnett | 711/153 |
| 6,301,646 B1 | 10/2001 | Hostetter | |
| 6,308,270 B1 | 10/2001 | Guthery et al. | |
| 6,314,409 B1 | 11/2001 | Schneck et al. | |
| 6,321,314 B1 | 11/2001 | Van Dyke | |
| 6,327,652 B1 | 12/2001 | England et al. | |
| 6,330,670 B1 | 12/2001 | England et al. | |
| 6,339,815 B1 | 1/2002 | Feng | |
| 6,339,816 B1 * | 1/2002 | Bausch | 711/163 |
| 6,357,004 B1 | 3/2002 | Davis | |
| 6,363,485 B1 | 3/2002 | Adams | |
| 6,374,286 B1 | 4/2002 | Gee et al. | |
| 6,374,317 B1 | 4/2002 | Ajanovic et al. | 710/105 |

| | | |
|---|---|---|
| 6,378,068 B1 | 4/2002 | Foster |
| 6,378,072 B1 | 4/2002 | Collins et al. |
| 6,389,537 B1 | 5/2002 | Davis et al. |
| 6,397,242 B1 | 5/2002 | Devine et al. |
| 6,397,379 B1 | 5/2002 | Yates, Jr. et al. |
| 6,412,035 B1 | 6/2002 | Webber |
| 6,421,702 B1 | 7/2002 | Gulick |
| 6,435,416 B1 | 8/2002 | Slassi |
| 6,445,797 B1 | 9/2002 | McGough et al. |
| 6,463,535 B1 | 10/2002 | Drews et al. |
| 6,463,537 B1 | 10/2002 | Tello |
| 6,499,123 B1 | 12/2002 | McFarlane et al. |
| 6,505,279 B1 | 1/2003 | Phillips et al. |
| 6,507,904 B1 | 1/2003 | Ellison et al. |
| 6,529,909 B1 | 3/2003 | Bowman-Amuah |
| 6,535,988 B1 | 3/2003 | Poisner |
| 6,557,104 B1 | 4/2003 | Vu et al. |
| 6,560,627 B1 | 5/2003 | McDonald et al. |
| 6,609,199 B1 | 8/2003 | DeTreville |
| 6,615,278 B1 | 9/2003 | Curtis |
| 6,633,963 B1 | 10/2003 | Ellison et al. |
| 6,633,981 B1 | 10/2003 | Davis |
| 6,651,171 B1 | 11/2003 | England et al. |
| 6,678,825 B1 | 1/2004 | Ellison et al. |
| 6,684,326 B1 | 1/2004 | Cromer et al. |
| 2001/0021969 A1 | 9/2001 | Burger et al. |
| 2001/0027511 A1 | 10/2001 | Wakabayashi et al. |
| 2001/0027527 A1 | 10/2001 | Khidekel et al. |
| 2001/0037450 A1 | 11/2001 | Metlitski et al. |
| 2002/0007456 A1 | 1/2002 | Peinado et al. |
| 2002/0023032 A1 | 2/2002 | Pearson et al. |
| 2002/0147916 A1 | 10/2002 | Strongin et al. |
| 2002/0166061 A1 | 11/2002 | Falik et al. |
| 2002/0169717 A1 | 11/2002 | Challener |
| 2003/0018892 A1 | 1/2003 | Birney et al. |
| 2003/0074548 A1 | 4/2003 | Cromer et al. |
| 2003/0115453 A1 | 6/2003 | Grawrock |
| 2003/0126442 A1 | 7/2003 | Glew et al. |
| 2003/0126453 A1 | 7/2003 | Glew et al. |
| 2003/0159056 A1 | 8/2003 | Cromer et al. |
| 2003/0188179 A1 | 10/2003 | Challener et al. |
| 2003/0196085 A1 | 10/2003 | Lampson et al. |
| 2004/0117539 A1 | 6/2004 | Bennett et al. |

FOREIGN PATENT DOCUMENTS

| | | |
|---|---|---|
| EP | 0602867 | 6/1994 |
| EP | 0892521 | 1/1999 |
| EP | 0930567 A3 | 7/1999 |
| EP | 0961193 | 12/1999 |
| EP | 0965902 | 12/1999 |
| EP | 1030237 | 8/2000 |
| EP | 1055989 | 11/2000 |
| EP | 1056014 | 11/2000 |
| EP | 1085396 | 3/2001 |
| EP | 1146715 A1 | 10/2001 |
| EP | 1209563 | 5/2002 |
| EP | 1271277 | 1/2003 |
| JP | 2000076139 | 3/2000 |
| WO | WO9524696 | 9/1995 |
| WO | WO-9729567 | 8/1997 |
| WO | WO9812620 | 3/1998 |
| WO | WO 98/34365 | 8/1998 |
| WO | WO 98/44402 | 10/1998 |
| WO | WO 99/05600 | 2/1999 |
| WO | WO 99/09482 | 2/1999 |
| WO | WO9918511 | 4/1999 |
| WO | WO 99/57863 | 11/1999 |
| WO | WO9965579 | 12/1999 |
| WO | WO0021238 | 4/2000 |
| WO | WO 00/62232 | 10/2000 |
| WO | WO-0127723 | 4/2001 |
| WO | WO-0127821 | 4/2001 |
| WO | WO0163994 | 8/2001 |
| WO | WO-0175565 | 10/2001 |
| WO | WO-0175595 | 10/2001 |
| WO | WO0201794 | 1/2002 |
| WO | WO-0217555 | 2/2002 |
| WO | WO02060121 | 8/2002 |
| WO | WO-02086684 | 10/2002 |
| WO | WO-0175564 | 11/2002 |
| WO | WO03058412 | 7/2003 |

OTHER PUBLICATIONS

Goldberg, Robert P., "Survey of Virtual Machine Research," IEEE Computer Magazine vol. 7, No. 6, pp. 34-45, 1974.

Gong, Li, et al., "Going Beyond the Sandbox: An Overview of the New Security Architecture in the Java Development Kit 1.2," JavaSoft, Sun Microsystems, Inc., Proceedings of the USENIX Symposium on Internet Technologies and Systems, Monterey, California, 11 pages Dec. 1997.

Gum, P.H., "System/370 Extended Architecture: Facilities for Virtual Machines," IBM J. Research Development, vol. 27, No. 6, pp. 530-544, Nov. 1983.

Heinrich, J., "MIPS R4000 Microprocessor User's Manual," Chapter 4, Memory Management, pp. 61-97, 1993.

Heinrich, J., "MIPS R4000 Microprocessor User's Manual," Second Edition, Chapter 4: Memory Management, pp. 67-79, 1994.

Intel Corporation, Intel386™ DX Microprocessor, 32-Bit CHMOS Microprocessor With Integrated Memory Management, 56 pages, Dec. 1995.

Lawton, K., "Running Multiple Operation Systems Concurrently On An IA32 PC Using Virtualization Techniques," http://www.plex86.org/research/paper.txt., pp. 1-31, downloaded Aug. 9, 2001.

MOTOROLA, M68040 User's Manual (Including the MC68040, MC68040V, MC68LC040, MC68EC040, and MC68EC040V), Revised 1993.

Rosenblum, M., "VMware's Virtual Platform™ A Virtual Machine Monitor for Commodity PCs," Proceedings of the 11th Hotchips Conference, Stanford University Palo Alto, California, pp. 185-196, Aug. 1999.

Trusted Computing Platform Alliance (TCPA), Main Specification Version 1.1a, 321 pages, Copyright 2000-2001.

Brands, Stefan, "Restrictive Blinding of Secret-Key Certificates", *SPRINGER-VERLAG* XP002201306, (1995),Chapter 3.

Chien, Andrew A., et al., "Safe and Protected Execution for the Morph/AMRM Reconfigurable Processor", *7th Annual IEEE Symposium*, FCCM '99 Proceedings, XP010359180, ISBN 0-7695-0375-6, Los Alamitos, CA, (Apr. 21, 1999),209-221.

Davida, George I., et al., "Defending Systems Against Viruses through Cryptographic Authentication", *Proceedings of the Symposium on Security and Privacy*, IEEE Comp. Soc. Press, ISBN 0-8186-1939-2,(May 1989).

IBM, "Information Display Technique for a Terminate Stay Resident Program IBM Technical Disclosure Bulletin", TDB-ACC-NO. NA9112156, vol. 34, Issue 7A, (Dec. 1, 1991), 156-158.

INTEL, "IA-32 Intel Architecture Software Developer's Manual", vol. 3: *System Programming Guide*, Intel Corporation—2003, 13-1 through 13-24.

Karger, Paul A., et al., "a VMM Security Kernal for the VAX Architecture", *Proceedings of the Symposium on Research in Security and Privacy*, XP010020182, ISBN 0-8186-2060-9, Boxborough, MA, (May 7, 1990),2-19.

Kashiwagi, Kazuhiko; et al., "Design and Implementation of Dynamically Reconstructing System Software", *Software Engineering Conference*, Proceedings 1996 Asia-Pacific Seoul, South Korea Dec. 4-7, 1996, Los Alamitos, CA USA, IEEE Comput. Soc, US, ISBN 0-8186-7638-8,(1996).

Luke, Jahn , et al., "Replacement Strategy for Aging Avionics Computers", *IEEE AES Systems Magazine*, XP002190614,(Mar. 1999).

Menzes, Oorschot, "Handbook of Applied Cryptography", *CRC Press LLC*, USA XP002201307, (1997),475.

Richt, Stefan, et al., "In-Circuit-Emulator Wird Echtzeittauglich", *Elektronic*, Franzis Verlag GMBH, Munchen, DE, vol. 40, No. 16, XP000259620,(100-103),Aug. 6, 1991.

Robin, John S., et al., "Analysis of the Pentium's Ability to Support a Secure Virtual Machine Monitor", *Proceedings of the 9th USENIX Security Symposium*, XP002247347, Denver, Colorado, (Aug. 14, 2000),1-17.

Saez, Sergio, et al., "A Hardware Schedular for Complex Real-Time Systems", *Proceedings of the IEEE International Symposium on Industrial Electronics*, XP002190615,(Jul. 1999),43-48.

Sherwood, Timothy, et al., "Patchable Instruction ROM Architecture", *Department of Computer Science and Engineering*, University of California, San Diego, La Jolla, CA, (Nov. 2001).

Compaq Computer Corporation, "Trusted Computing Platform Alliance (TCPA) Main Specification Version 1.1a", XP002272822, (Jan. 25, 2001),1-321.

Coulouris, George, et al., "Distributed Systems, Concepts and Designs", 2nd Edition, (1994),422-424.

Crawford, John, "Architecture of the Intel 80386", *Proceedings of the IEEE International Conference on Computer Design: VLSI in Computers and Processors (ICCD '86)*, (Oct. 6, 1986), 155-160.

Fabry, R.S., "Capability-Based Addressing", Fabry, R.S., "*Capability-Based Addressing," Communications of the ACM*, vol. 17, No. 7, (Jul. 1974),403-412.

Frieder, Gideon, "The Architecture And Operational Characteristics of the VMX Host Machine", *The Architecture And Operational Characteristics of the VMX Host Machine, IEEE*, (1982),9-16.

HP Mobile Security Overview, "HP Mobile Security Overview", (Sept. 2002),1-10.

IBM Corporation, "IBM ThinkPad T30 Notebooks", *IBM Product Specification*, located at www-1.ibm.com/service/files/cisco_t30_spec_sheet_070202.pdf, last visited Jun. 23, 2004,(Jul. 2, 2002),1-6.

Intel Corporation, "IA-64 System Abstraction Layer Specification", *Intel Product Specification*, Order NO. 245359-001, (Jan. 2000),1-112.

Intel Corporation, "Intel 82802AB/82802AC Firmware Hub (FWH)", *Intel Product Datasheet*, Document No. 290658-004, (Nov. 2000), 1-6, 17-28.

Intel Corporation, "Intel IA-64 Architecture Software Developer's Manual", vol. 2: *IA-64 System Architecture*, Order No. 245318-001, (Jan. 2000),i, ii, 5.1-5.3, 11.1-11.8, 11.23-11.26.

Menezes, Alfred J., et al., "Handbook of Applied Cryptography", *CRC Press Series on Discrete Mathematices and its Applications*, Boca Raton, Fl, XP002165287, ISBN 0849385237 ,(Oct. 1996),403-405, 506-515, 570.

Nanba, S., et al., "VM/4: ACOS-4 Virtual Machine Architecture", *VM/4: ACOS-4 Virtual Machine Architecture, IEEE*, (1985),171-178.

RSA SECURITY, "Hardware Authenticators", www.rsasecurity.com/node.asp?id=1158, 1-2.

RSA SECURITY, "RSA SecurID Authenticators", www.rsasecurity.com/products/securid/datasheets/SID_DS_0103.pdf, 1-2.

RSA SECURITY, "Software Authenticators", www.srasecurity.com/node.asp?id=1313, 1-2.

Schneier, Bruce, "Applied Cryptography: Protocols, Algorithm, and Source Code in C", Wiley, John & Sons, Inc., XP002939871; ISBN 0471117099,(Oct. 1995),47-52.

Schneier, Bruce, "Applied Cryptography: Protocols, Algorithm, and Source Code in C", Wiley, John & Sons, Inc., XP002138607; ISBN 0471117099,(Oct. 1995),56-65.

Schneier, Bruce, "Applied Cryptography: Protocols, Algorithms, and Source Code C", Wiley, John & Sons, Inc., XP0021111449; ISBN 0471117099, (Oct. 1995), 169-187.

Schneier, Bruce, "Applied Cryptography: Protocols, Algorithms, and Source Code in C", *2nd Edition*: Wiley John & Sons, Inc., XP002251738; ISBN 0471128457,(Nov. 1995),28-33; 176-177; 216-217; 461-473; 518-522.

PCT International Search Report for International application No. PCT/US03/09482 dated Dec. 21, 2004.

Hall, Judith, et al., "Virtualizing the VAX Architecture", Digital Equipment Corporation, Littleton, Mass., 1991 (pp. 380-389).

* cited by examiner

CONTROL REGISTER ACCESS VIRTUALIZATION PERFORMANCE IMPROVEMENT IN THE VIRTUAL-MACHINE ARCHITECTURE

FIELD OF THE INVENTION

The present invention relates generally to virtual machines, and more specifically to controlling accesses of guest software to registers in the virtual-machine architecture.

BACKGROUND OF THE INVENTION

A conventional virtual-machine monitor (VMM) typically runs on a computer and presents to other software the abstraction of one or more virtual machines. Each virtual machine may function as a self-contained platform, running its own "guest operating system" (i.e., an operating system hosted by the VMM). The guest operating system expects to operate as if it were running on a dedicated computer rather than a virtual machine. That is, the guest operating system expects to control various computer operations and have access to hardware resources during these operations. The hardware resources may include processor-resident resources (e.g., control registers) and resources that reside in memory (e.g., descriptor tables).

In a virtual-machine environment, the VMM should be able to have ultimate control over these resources to provide proper operation of virtual machines and for protection from and between virtual machines. To achieve this, the VMM typically intercepts and arbitrates all accesses made by guest software to the hardware resources. Specifically, when guest software requests an operation that requires access to a protected hardware resource, the control over this operation is transferred to the VMM which then assures the validity of the access, emulates the functionality desired by guest software and transfers control back to the guest software, thereby protecting the hardware resources and virtualizing accesses of guest software to hardware resources. Because the number of hardware resource elements that need to be protected from accesses by guest software is large and such accesses may be frequent, there is a significant performance cost associated with this protection and virtualization.

One example of a hardware resource that is frequently accessed by guest software is a control register. For instance, in the instruction-set architecture (ISA) of the Intel Pentium IV (referred to herein as the IA-32 ISA), there are a number of control registers that are used to configure the processor operating mode, control the memory subsystem configuration and hardware resources, etc. Typically, when guest software attempts to access a bit in a control register, the control is transferred to the VMM which is responsible for maintaining consistency between write and read operations initiated by the guest software with respect to this bit. That is, the VMM controls the value that guest software is allowed to write to each bit of the control register and the value that guest software reads from each bit. Such virtualization of control register accesses creates significant performance overheads.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EMBODIMENTS

Figure 1:
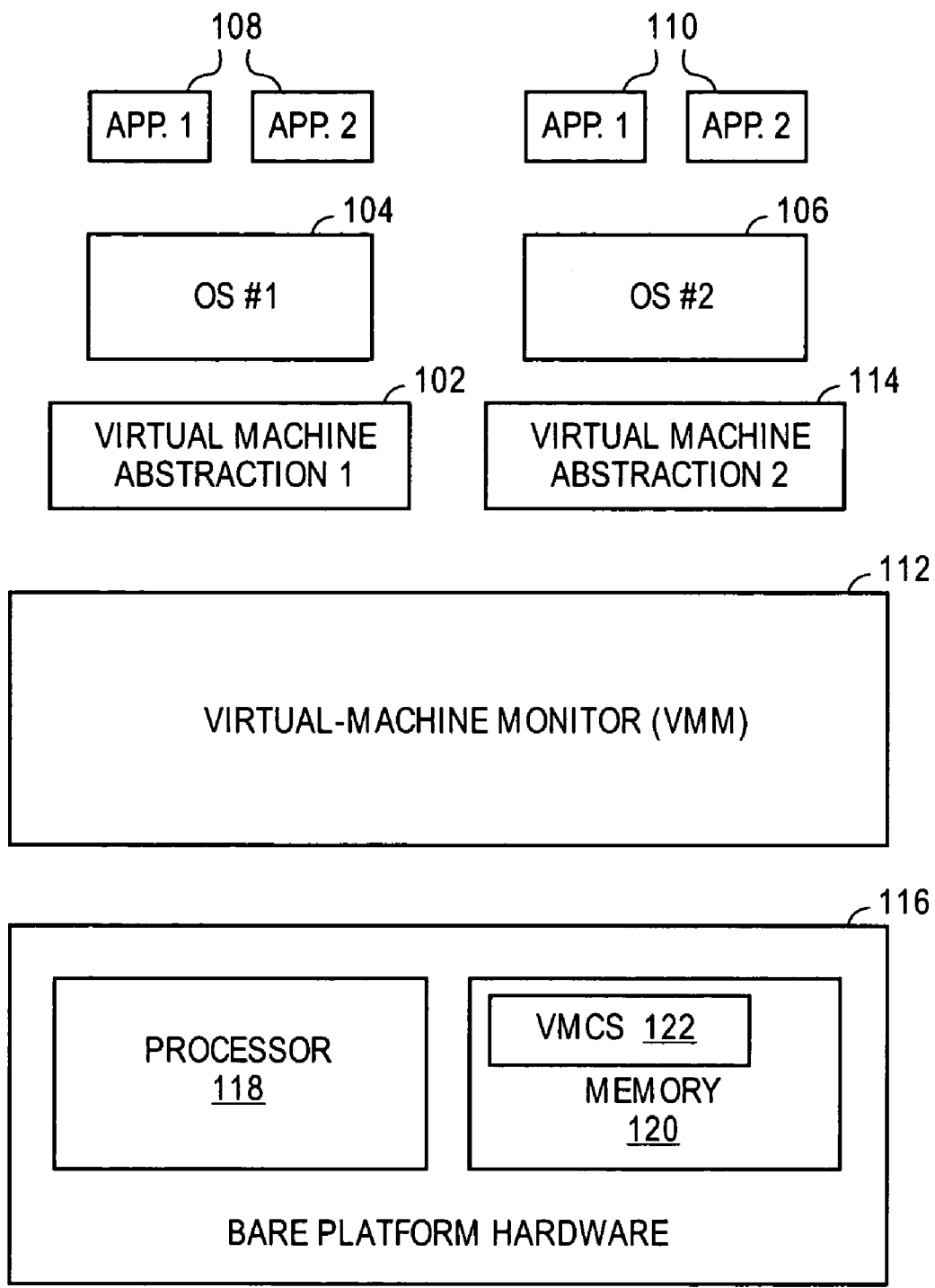
FIG. 1 illustrates one embodiment of a virtual-machine environment 100, in which the present invention may operate.

A method and apparatus for controlling accesses of guest software to registers in a virtual-machine architecture are described. In the following description, for purposes of explanation, numerous specific details are set forth in order to provide a thorough understanding of the present invention. It will be apparent, however, to one skilled in the art that the present invention can be practiced without these specific details.

Some portions of the detailed descriptions that follow are presented in terms of algorithms and symbolic representations of operations on data bits within a computer system's registers or memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer-system memories or registers or other such information storage, transmission or display devices.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

FIG. 1 illustrates one embodiment of a virtual-machine environment 100, in which the present invention may operate. In this embodiment, bare platform hardware 116 comprises a computing platform, which may be capable, for example, of executing a standard operating system (OS) or a virtual-machine monitor (VMM), such as a VMM 112. The VMM 112, though typically implemented in software, may emulate and export a bare machine interface to higher level software. Such higher level software may comprise a standard or real-time OS, may be a highly stripped down operating environment with limited operating system functionality, may not include traditional OS facilities, etc. Alternatively, for example, the VMM 112 may be run within, or on top of, another VMM. VMMs and their typical features and functionality are well-known by those skilled in the art and may be implemented, for example, in software, firmware or by a combination of various techniques.

The platform hardware 116 includes a processor 118 and memory 120. Processor 118 can be any type of processor capable of executing software, such as a microprocessor, digital signal processor, microcontroller, or the like. The processor 118 may include microcode or hardcoded logic for performing the execution of method embodiments of the present invention.

The platform hardware 116 can be of a personal computer (PC), mainframe, handheld device, portable computer, set-top box, or any other computing system.

Memory 120 can be a hard disk, a floppy disk, random access memory (RAM), read only memory (ROM), flash memory, or any other type of machine medium readable by processor 118. Memory 120 may store instructions for performing the execution of method embodiments of the present invention.

The VMM 112 presents to other software (i.e., "guest" software) the abstraction of one or more virtual machines (VMs), which may provide the same or different abstractions to the various guests. FIG. 1 shows two VMs, 102 and 114. The guest software running on each VM may include a guest OS such as a guest OS 104 or 106 and various guest software applications 108–110. Each of the guest OSs 104 and 106 expects to control access to physical resources (e.g., processor registers, memory and memory-mapped I/O devices) within the VMs 102 and 114 on which the guest OS 104 or 106 is running and to perform other functions.

The VMM 112 facilitates functionality desired by guest software while retaining ultimate control over privileged hardware resources within the platform hardware 116. Specifically, once guest software attempts to access a privileged resource, the control over the processor is transferred to the VMM 112, which then decides whether to perform a requested operation (e.g., emulate it for the guest software, proxy the operation directly to the platform hardware 116, etc.) or deny access to the resource to facilitate security, reliability or other mechanisms. The act of facilitating the functionality for the guest software may include a wide variety of activities on the part of the VMM 112. The activities of the VMM 112 as well as its characteristics should not limit the scope of the present invention.

In one embodiment, the transfer of control from guest software to VMM is dictated by control bit settings in a virtual machine control structure (VMCS) 122. Settings in the VMCS 122 may prevent guest software from performing operations that may result in its access of certain privileged hardware resources. Different guest software may execute with different control bit settings in different VMCS memory images, though only one such VMCS is shown in FIG. 1. The VMCS 122 resides in memory 120 and is maintained by the processor 118. It should be noted that any other data structure (e.g., an on-chip cache, a file, a lookup table, etc.) may be used to store the VMCS 122 or the fields associated with each designated hardware resource without loss of generality.

When guest software attempts to perform an operation which accesses protected resources, control is transferred to the VMM 112. The VMM 112 has access to all platform hardware 116. When such a transition occurs, the VMM 112 receives control over the operation initiated by guest software. The VMM 112 then may perform this operation or deny access as described above, and may transfer control back to guest software by executing a special instruction. The control of guest software through this mechanism is referred to herein as VMX operation and the transfer of control from the guest software to VMM is referred to herein as a VM exit.

In one embodiment, the execution of certain instructions, certain exceptions and interrupts and certain platform events may cause a VM exit. These potential causes of VM exits are referred to herein as virtualization events. For example, a VM exit may be generated when guest software attempts to perform an operation (e.g., an instruction) that may result in its access of certain privileged hardware resources (e.g., a control register or an IO port).

In an embodiment, when a VM exit occurs, components of the processor state used by guest software are saved, and components of the processor state required by the VMM 112 are loaded. This saving and loading of processor state may, depending on the processor ISA, have the effect of changing the active address space (e.g., in the IA-32 ISA, the active address space is determined by the values in the control registers, which may be saved and restored on VM exit). In one embodiment, the components of the processor state used by guest software are stored in a guest-state area of VMCS 122 and the components of the processor state required by the VMM 112 are stored in a monitor-state area of VMCS 122.

In one embodiment, when a transition from the VMM to guest software occurs, the processor state that was saved at the VM exit is restored and control is returned to the guest OS 104 or 106 or guest applications 108 or 110.

In an embodiment, when a VM exit occurs, control is passed to the VMM 112 at a specific entry point (e.g., an instruction pointer value) delineated in the VMCS 122. In another embodiment, control is passed to the VMM 112 after vectoring through a redirection structure (e.g., the interrupt-descriptor table in the IA-32 ISA). Alternatively, any other mechanism known in the art can be used to transfer control from the guest software to the VMM 112.

Because the number of hardware resource elements that need to be protected from accesses by guest software is large and such accesses may be frequent, there is a significant performance cost associated with this protection and virtualization. In addition, an operation initiated by guest software may involve access to a privileged resource, which may pose no problem to the security and proper operation of the VMs 102 and 114. For example, in the IA-32 ISA, control register 0 (CR0) includes a task-switch (TS) bit that is used to optimize context switching by avoiding saving and restoring floating-point state until the state is accessed. The update of the TS bit by the guest OS through the Clear Task-Switched Flag (CLTS) instruction is unlikely to pose a problem to system security and proper operation of the VMs 102 and 114. In contrast, the paging enable (PG) bit of CR0 configures the processor operating mode and as such must be controlled exclusively by the VMM 112. In some cases, the VMM 112 may not allow the guest software to disable paging and therefore must control attempts of the guest software to do so.

In one embodiment, a filtering mechanism is provided for reducing the number of VM exits caused by accesses of guest software to such hardware resources as registers (e.g., control registers, general purpose registers, model-specific registers, etc.) or memory-based resources (e.g., paging control fields in memory, etc.). It should be noted that while an exemplary embodiment of the present invention is described below with reference to a register, the teachings of the present invention may be applied to any other hardware resource without loss of generality.

The filtering mechanism functions using one or more fields associated with each designated hardware resource as will be described in greater detail below. In one embodiment, the fields associated with each designated hardware resource are contained in a VMCS 122.

Figure 2:
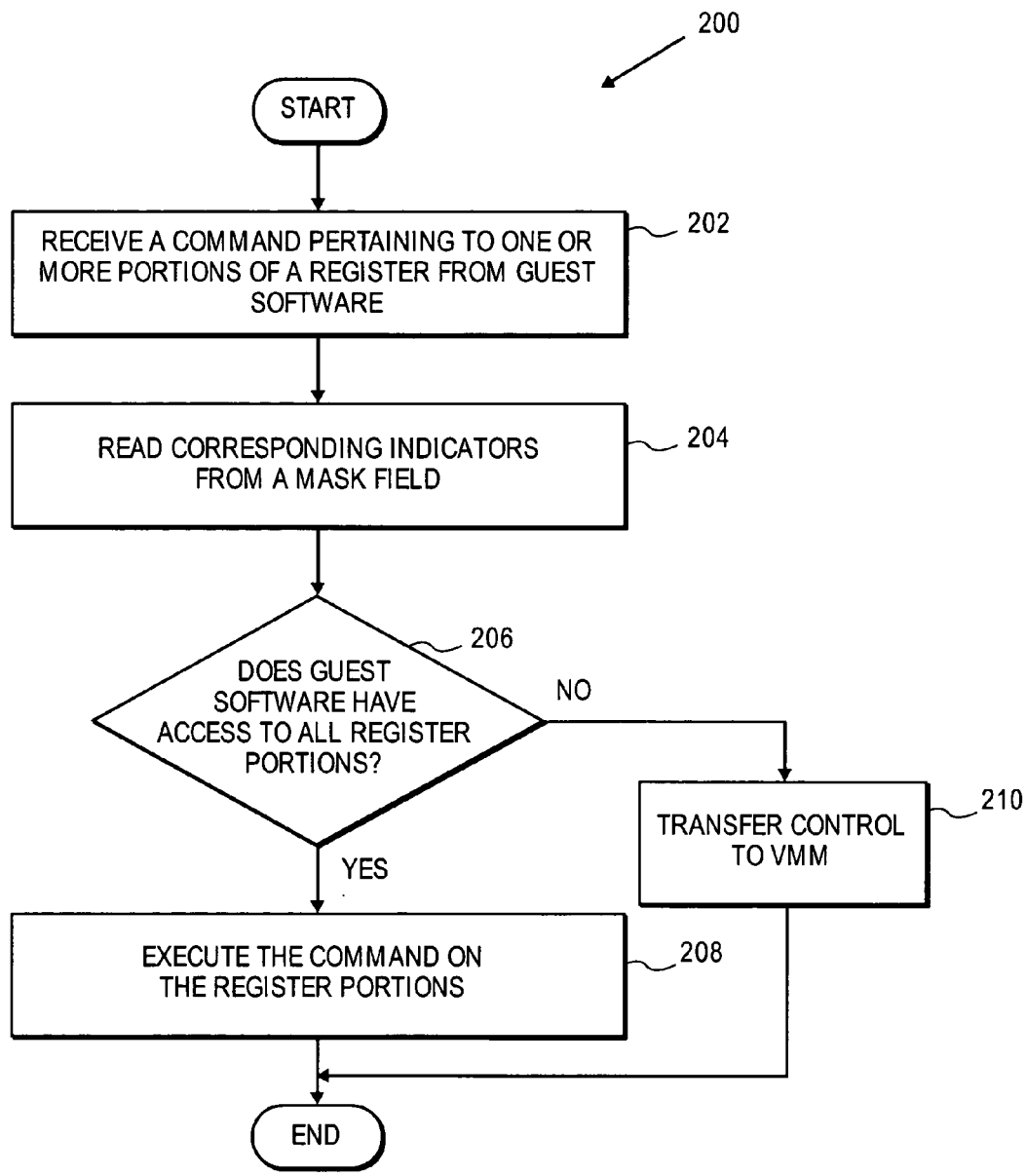
FIG. 2 is a flow diagram of one embodiment of a process for filtering accesses of guest software to a hardware resource such as a register.

FIG. 2 is a flow diagram of one embodiment of a process 200 for filtering accesses of guest software to a hardware resource such as a register. The process may be performed by processing logic that may comprise hardware (e.g., circuitry, dedicated logic, microcode, etc.), software (such as run on a general purpose computer system or a dedicated machine), or a combination of both.

Referring to FIG. 2, process 200 begins with processing logic receiving a command pertaining to one or more portions of a register from guest software (processing block 202). A register portion may be a particular single bit of the register or multiple (contiguous or non-contiguous) bits of the register. The command pertaining to the register portions may be a read command requesting to read data from the register portions or a write command requesting to write data to the register portions. The register may represent a control register (e.g., CR0 or CR4 in the IA-32 ISA), an integer register, or any other register or memory-based resource.

Next, processing logic reads corresponding indicators from a mask field (processing block 204). The mask field includes a set of indicators corresponding to portions of the register. For example, if the register is a 32-bit control register (e.g., CR0 or CR4 in the IA-32 ISA), the mask field may include 32 indicators, with each indicator corresponding to a particular bit of the control register. Alternatively, the mask field may have fewer indicators than the number of bits in the register because the register may have unused bits, some indicators in the mask field may correspond to two or more bits, or for any other reason. Each indicator in the mask field provides information on whether a portion is under guest control (i.e., the guest software is permitted to access the corresponding portion of the register) or under control of the VMM. In an embodiment of the invention, bits in the register that do not have a corresponding mask bit are assumed to be under guest control. In another embodiment of the invention, they are assumed to be under VMM control.

At decision box 206, processing logic determines whether guest software is permitted to access all of the requested register portions based on the corresponding indicators from the mask field. If the determination is positive, processing logic executes the command on the requested register portions (processing block 208). That is, processing logic reads data from, or writes data to, the requested register portions.

Otherwise, if the determination made at decision box 206, is negative, then in one embodiment, processing logic transfers control to the VMM (processing block 210).

In an alternative embodiment, an extra field is used to further reduce the number of situations in which control is transferred in to the VMM. The extra field is referred to herein as a shadow value field. Each portion of the shadow value field corresponds to a particular portion of the register and stores the value that guest software expects to see in this portion of the register. In an embodiment of the invention, the value of the shadow value field is maintained by the VMM and is stored in the VMCS. In one embodiment, only the register portions with the indicators in the mask field that indicate the inability of guest software to access these register portions have corresponding portions in the shadow value field. For example, in the IA-32 ISA, if guest software is not permitted to access bits 1 through 10 in CR0 as reflected by values of indicators in the mask field, the size of the shadow value field will be limited to 10 bits that correspond to bits 1 through 10 of CR0. In another embodiment, each register portion with an indicator (regardless of its value) in the mask field has a corresponding portion in the shadow value field.

Figure 4:
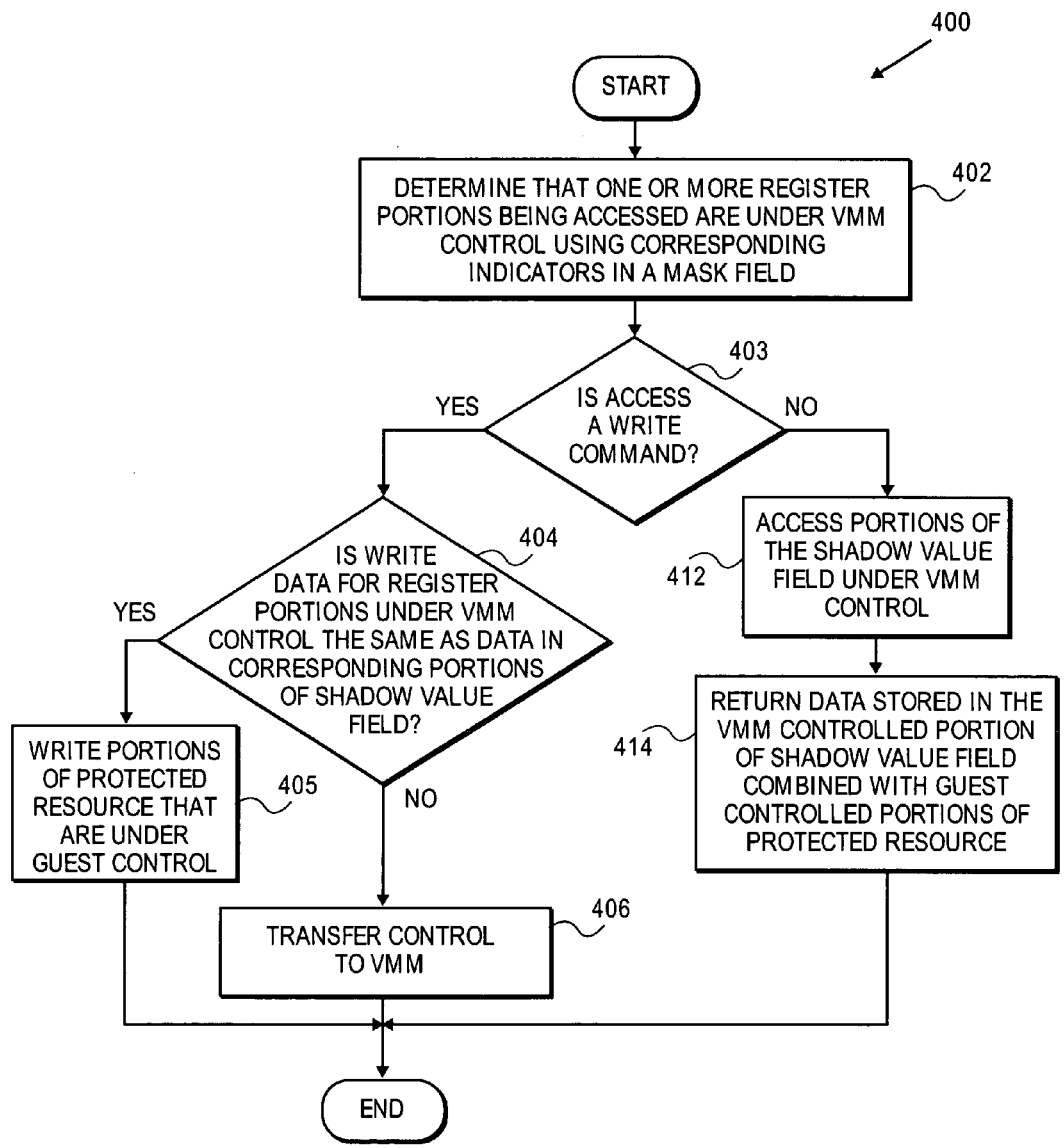
FIG. 4 is a flow diagram of one embodiment of a process for providing an additional filtering of guest software accesses to a hardware resource such as a register.

FIG. 4 is a flow diagram of one embodiment of a process 400 for providing an additional filtering of guest software accesses to a hardware resource such as a register. In one embodiment, process 400 replaces block 210 in FIG. 2. The process may be performed by processing logic that may comprise hardware (e.g., circuitry, dedicated logic, microcode, etc.), software (such as run on a general purpose computer system or a dedicated machine), or a combination of both.

Referring to FIG. 4, process 400 begins at processing block 402 with processing logic determining that one or more register portions being accessed are under control of the VMM based on corresponding one or more indicators in a mask field, as discussed above in conjunction with FIG. 2.

Next, at decision box 403, processing logic determines whether the access is a command to write data to the requested register portions. If the determination is positive, i.e., the access is a write command, processing logic determines whether the data that the guest wishes to write to each of the portions is equal to data stored in corresponding portions of a read shadow field for all portions under VMM control (decision box 404). If this determination is positive for all requested portions that are under VMM control, the guest is allowed to write data to all portions of the actual register resource that are under guest control (as determined by the corresponding bits in the mask field) (processing block 405) and then process 400 ends. If the determination is negative for any requested portions that are under VMM control, processing logic transfers control to the VMM (processing block 406). The VMM then updates the corresponding portion of the shadow value field and actual register resource as necessary according to its implementation requirements and transfers control back to guest software.

Alternatively, if the command initiated by guest software is a command to read data from the requested register portions, control is not transferred to the VMM. Specifically, processing logic accesses the corresponding portions of the shadow value field for all requested portions that are under VMM control (processing block 412) and returns data stored in these portions of the shadow value field combined with values from the actual register resource for portions of the resource that are under guest control to guest software (processing block 414).

One embodiment in which the transfer of control to the VMM is supported via VMX operation discussed in greater detail above with reference to FIG. 1 will now be described in more detail.

In one embodiment, the VMM maintains a set of control bits to configure which virtualization events will cause a VM exit. This set of control bits is referred to herein as a redirection map. In one embodiment, the redirection map is contained in the VMCS 122 of FIG. 1. Once an occurrence of a virtualization event is detected, the redirection map is consulted to find an unconditional exit bit associated with this virtualization event. The bit indicates whether this virtualization event will unconditionally result in a VM exit. For example, the redirection map may include two bits for each control register, with one bit controlling VM exits on guest requests to read data from the control register and the other bit controlling VM exits on guest requests to write data to the control register.

In addition, in one embodiment, for each designated resource (e.g., CR0 or CR4 in the IA-32 ISA), the redirection map includes a bit indicating whether a mask field will be used for this resource and a bit indicating whether a shadow value field will be used for this resource.

Figure 5:
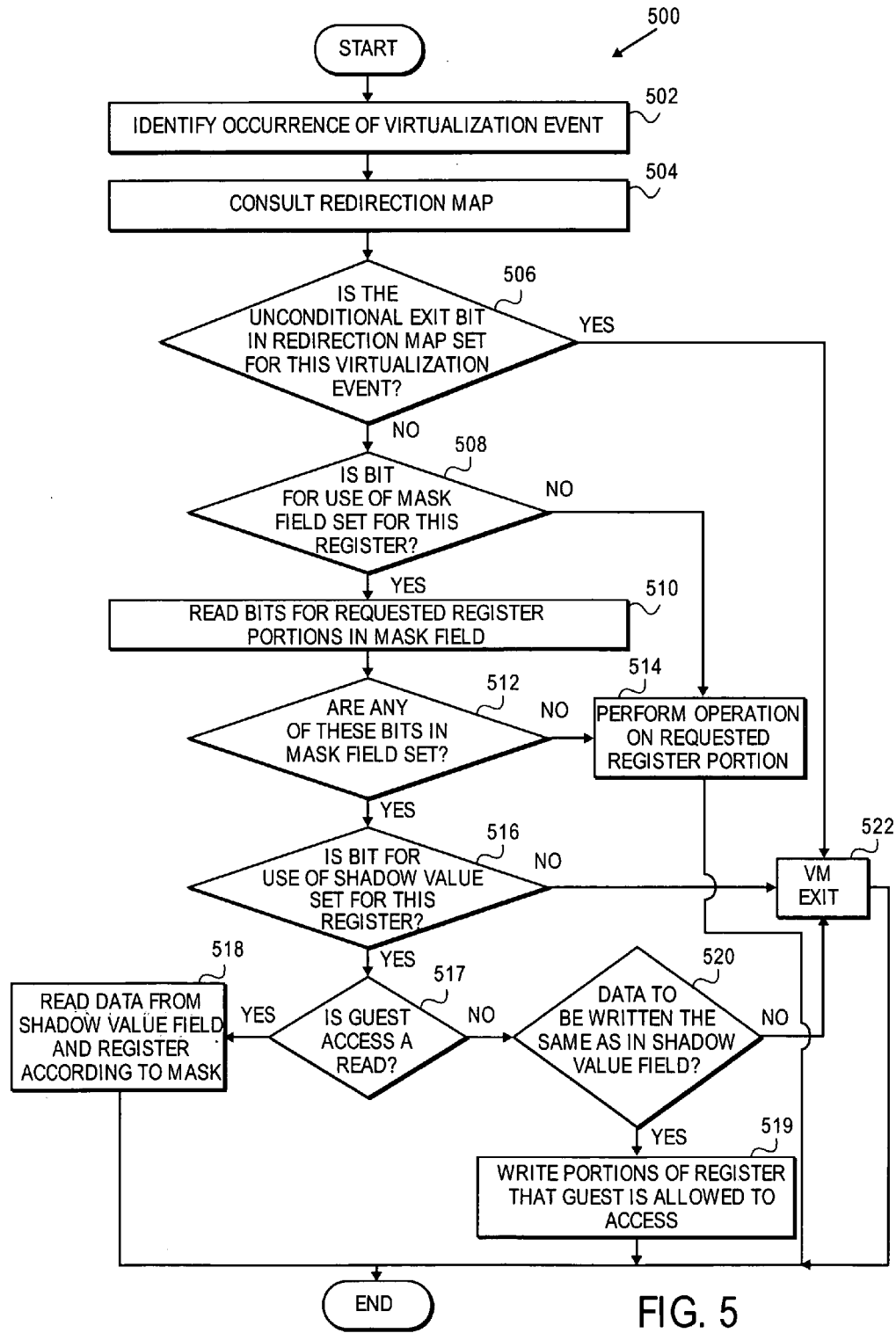
FIG. 5 is flow diagram of one embodiment of a process for controlling access to a hardware resource such as a register during VMX operation using a redirection map.

FIG. 5 is flow diagram of one embodiment of a process 500 for controlling access to a hardware resource such as a register during VMX operation using a redirection map. The process may be performed by processing logic that may comprise hardware (e.g., circuitry, dedicated logic, microcode, etc.), software (such as run on a general purpose computer system or a dedicated machine), or a combination of both.

Referring to FIG. 5, process 500 begins at processing block 502 with processing logic identifying an occurrence of a virtualization event caused by a request of guest software to access a portion of a hardware resource such as a control register. This request is either a command to read data from one or more portions of a particular register or a command to write data to one or more portions of a particular register.

At processing block 503, processing logic consults the redirection map to determine if the unconditional exit bit associated with this virtualization event is set (decision box 506). If this bit is set, processing logic triggers a VM exit (processing block 522). For example, in the IA-32 ISA the redirection map may include bits to unconditionally cause VM exits on writes to CR2, reads from CR0, writes to CR4, etc.

Alternatively, if the unconditional exit bit is not set, processing logic further determines whether a mask field is to be used for the register (decision box 508). This determination is made using a designated bit in the redirection map. For example, in the IA-32 ISA there may be bits in the redirection map indicating if a mask is used for CR0, if a mask is used for CR4, etc. If the mask field is not to be used for this register, processing logic executes the requested read or write command on the requested register portions (processing block 514). Otherwise, processing logic reads mask field bits corresponding to the requested register portions (processing block 510). These bits are referred to as the requested mask field bits. The requested mask field bits are examined to determine if one or more of them are set (indicating that one or more of the corresponding register portions are under VMM control) (decision box 512).

If none of the requested mask field bits are set, i.e., guest software is allowed to access all of the requested register portions, processing logic executes the requested read or write command on the register portions (processing block 514). Otherwise, if any bits in the requested mask field are set, processing logic determines whether a shadow value field will be used for the register based on a designated bit in the redirection map (decision box 516). For example, in the IA-32 ISA there may be bits in the redirection map to indicate if a shadow value is used for CR0 accesses, for CR4 accesses, etc. If the shadow value field is not to be used for the register, processing logic triggers a VM exit (processing box 522).

If the shadow value field is to be used for the register and the request initiated by guest software is a read command (decision box 517), processing logic reads the bits of the shadow value field that correspond to those register portions that are set in the requested mask field and hence are under VMM control (processing block 518). These bits from the shadow value field are combined with the bits from the actual register that correspond to bits in the requested mask field that are not set and hence are under guest control. These combined values are then returned to guest software. Values of bits in the protected resource which are not represented in the mask and/or shadow value field may be read from the register.

If the shadow value field is to be used for the register but the request initiated by guest software is a write command, processing logic compares the value requested to be written to register bits under VMM control with the value of corresponding bits in the shadow value field (decision box 520). If these two values are the same, the requested register portions that are under guest control are written (processing block 519). That is, the bits under guest control are written; those under VMM control remain unchanged. In one embodiment, bits in the register which are not represented in the mask and/or shadow value field may be written if they are assumed to be under guest control. In another embodiment, data is not written to the unrepresented bits because they are assumed to be under VMM control. Otherwise, if the two values compared at decision box 520 are different, processing logic triggers a VM exit (processing block 522).

Figure 3:
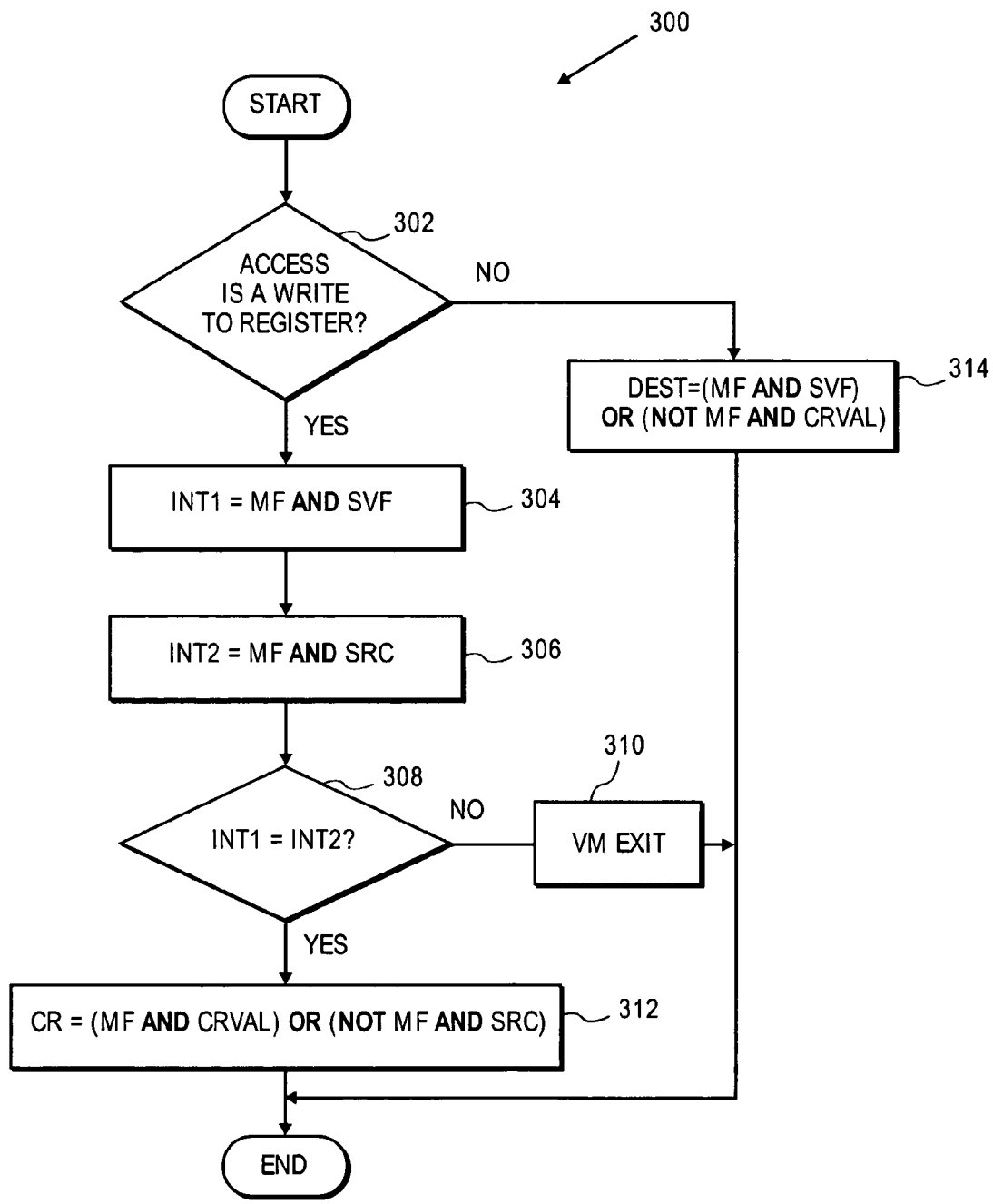
FIG. 3 is a flow diagram of one embodiment of a process for filtering VM exits using a set of criteria.

In one embodiment, a set of criteria is predefined by the VMM for filtering VM exits. The criteria are based on combinations of values stored in a mask field and a shadow value field and a value that guest software wishes to write to the register. FIG. 3 is a flow diagram of one embodiment of a process 300 for filtering VM exits using a set of criteria. The process may be performed by processing logic that may comprise hardware (e.g., circuitry, dedicated logic, microcode, etc.), software (such as run on a general purpose computer system or a dedicated machine), or a combination of both.

Referring to FIG. 3, process 300 begins with processing logic determining whether the access of guest software is a request to write data to a register (decision box 302). If the determination is negative, i.e., the access is a request to read data from the register, the resulting value of the read request is determined using the following expression:

$$\text{DEST} = (\text{MF AND SVF}) \text{ OR } (\text{NOT MF AND CRVAL}),$$

where AND, NOT and OR are bitwise Boolean operators, MF is a value of the mask field, SVF is a value of the shadow value field, and CRVAL is the current value of the actual protected register. A bit in the mask field is set if a corresponding bit in the register is controlled by the VMM. Otherwise, if a bit in the register is controlled by guest software, then a corresponding bit in the mask field is equal to zero. A bit in the shadow field has the value that guest software expects to see in the corresponding bit of the register and may be different from the current value of the corresponding bit of the actual register.

According to the above expression, if the requested bit is controlled by guest software, the data is read from the register, and if the requested bit is controlled by the VMM, the data is read from the shadow value field.

If processing logic determines at decision box 302 that the access of guest software is a write request, processing logic combines the values of the mask field and shadow value field (processing block 304) as follows:

INT1=MF AND SVF.

In addition, processing logic combines the value of the mask field with the value that guest software wishes to write to the register (processing block 306) using the following expression:

INT2=MF AND SRC, where SRC is the value that the guest wishes to write to the register.

Further, processing logic compares the two combinations at decision box 308. If the two combinations are equal, i.e., all bits in the register are either controlled by guest software, or controlled by the VMM and the value of the corresponding bit in shadow value field is equal to the value that guest software wishes to write to the register, then processing logic executes the following expression at processing block 312:

CR=(MF AND CRVAL) OR (NOT MF AND SRC).

According to this expression, if a bit in the register is controlled by guest software, the bit will be updated with the value that guest software wishes to write. Otherwise, the value of the bit in the register will remain the same and will not be updated.

Alternatively, if the two combinations are not equal, i.e., at least one bit in the register is controlled by the VMM and the value of the corresponding bit in shadow value field is not equal to the value that guest software wishes to write to the register, then processing logic triggers a VM exit at processing block 310.

Note that the description of the process 300 is simplified by using the entire register (e.g., 32 bits for the CR0 register in the IA-32 ISA) and mask and shadow value fields that are 32 bits wide. A person of ordinary skill in the art will understand that embodiments of the present invention can apply to read and write operations that access only a limited subset of the register bits or that access bits in multiple registers. Additionally, those skilled in the art will see application of the invention to situations where there is not a bit-for-bit correspondence between the various elements involved (e.g. if bits in the mask apply to multiple bits in the protected resource).

Thus, a method and apparatus for controlling access of guest software to hardware resources have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving a command pertaining to one or more portions of a register from a virtual machine (VM);
determining whether the VM has access to the one or more portions of the register based on one or more indicators within a mask field that correspond to the one or more portions of the register, the one or more indicators indicating whether the one or more portions of the register are under control of the VM or a virtual machine monitor (VMM);
executing the command on the one or more portions of the register if the VM has access to each of the one or more portions of the register; and
transferring control to the VMM upon determining that the VM does not have access to at least one of the one or more portions of the register based on the corresponding indicators within the mask field.

2. The method of claim 1 wherein the mask field includes a set of indicators, each indicator within the set of indicators corresponding to a particular portion of the register and indicating whether the particular portion of the register is allowed to be accessed by the VM.

3. The method of claim 1 wherein each of the one or more portions of the register represent a particular bit of the register.

4. The method of claim 1 wherein the register is a control register.

5. The method of claim 1 wherein the command pertaining to the one or more portions of the register is a command to write data to the one or more portions of the register.

6. The method of claim 5 wherein executing the command on the one or more portions of the register includes writing the data to the one or more portions of the register.

7. The method of claim 5 further comprising:
detecting that data requested to be written to said at least one of the one or more portions of the register differs from a value expected by the VM to be stored in said at least one of the one or more portions of the register.

8. The method of claim 7 wherein detecting that the data differs from the value expected to be stored in the one or more portions of the register includes comparing the data with a value of one or more corresponding portions of a shadow value field.

9. The method of claim 8 further comprising:
the VMM updating the shadow value field with the data.

10. The method of claim 5 further comprising:
determining, based on the corresponding indicators within the mask field, that the one or more portions of the register includes at least one register portion accessible to the VM and at least one register portion inaccessible to the VM;
detecting that write data associated with said at least one register portion inaccessible to the VM is the same as a value expected by the VM to be stored in said at least one register portion inaccessible to the VM; and
writing, to said at least one register portion accessible to the VM, write data associated with said at least one register portion accessible to the VM.

11. The method of claim 1 wherein the command pertaining to the portion of the register is a command to read data from the one or more portions of the register.

12. The method of claim 11 wherein executing the command on the one or more portions of the register includes reading the data from the one or more portions of the register.

13. The method of claim 11 further comprising:
  determining that the VM does not have access to at least one of the one or more portions of the register based on one or more corresponding indicators within the mask field;
  accessing any of the one or more portions of the register that are permitted to be accessed by the VM;
  accessing one or more portions of a shadow value field that correspond to said at least one of the one or more portions of the register;
  combining data stored in the one or more corresponding portions of the shadow value field with data stored in said any of the one or more portions of the register that are permitted to be accessed by the VM; and
  returning the combined data to the VM.

14. A system comprising:
  a memory including a mask field; and
  a processor, coupled to the memory, to receive a command pertaining to one or more portions of a register from a virtual machine (VM), to determine whether the VM has access to the one or more portions of the register based on one or more indicators within the mask field that correspond to the one or more portions of the register, the one or more indicators indicating whether the one or more portions of the register are under control of the VM or a virtual machine monitor (VMM), to execute the command on the one or more portions of the register if the VM has access to each of the one or more portions of the register, and to transfer control to the VMM upon determining that the VM does not have access to at least one of the one or more portions of the register based on the corresponding indicators within the mask field.

15. The system of claim 14 wherein the mask field includes a set of indicators, each indicator within the set of indicators corresponding to a particular portion of the register and indicating whether the particular portion of the register is allowed to be accessed by the VM.

16. The system of claim 14 wherein each of the one or more portions of the register represent a particular bit of the register.

17. The system of claim 14 wherein the register is a control register.

18. The system of claim 14 wherein the command pertaining to the one or more portions of the register is a command to write data to the one or more portions of the register.

19. The system of claim 18 wherein executing the command on the one or more portions of the register includes writing the data to the one or more portions of the register.

20. The system of claim 18 wherein the processor is further to detect that data requested to be written to said at least one of the one or more portions of the register differs from a value expected by the VM to be stored in said at least one of the one or more portions of the register.

21. The system of claim 18 wherein the processor is further to determine, based on the corresponding indicators within the mask field, that the one or more portions of the register include at least one register portion accessible to the VM and at least one register portion inaccessible to the VM, to detect that write data associated with said at least one register portion inaccessible to the VM is the same as a value expected by the VM to be stored in said at least one register portion inaccessible to the VM, and to write, to said at least one register portion accessible to the VM, write data associated with said at least one register portion accessible to the VM.

22. The system of claim 20 wherein the processor is to detect that the data differs from the value expected to be stored in the one or more portions of the register by comparing the data with a value of one or more corresponding portions of a shadow value field.

23. The system of claim 18 wherein the processor is further to update the shadow value field with the data.

24. The system of claim 18 wherein the command pertaining to the portion of the register is a command to read data from the one or more portions of the register.

25. The system of claim 24 wherein executing the command on the one or more portions of the register includes reading the data from the one or more portions of the register.

26. The system of claim 24 wherein the processor is further to determine that the VM does not have access to at least one of the one or more portions of the register based on one or more corresponding indicators within the mask field, to access any of the one or more portions of the register that are permitted to be accessed by the VM, to access one or more portions of a shadow value field that correspond to said at least one of the one or more portions of the register, to combine data stored in the one or more corresponding portions of the shadow value field with data stored in said any of the one or more portions of the register that are permitted to be accessed by the VM, and to return the combined data to the VM.

27. A machine-readable medium containing instructions which, when executed by a processing system, cause the processing system to perform a method, the method comprising:
  receiving a command pertaining to one or more portions of a register from a virtual machine (VM);
  determining whether the VM has access to the one or more portions of the register based on one or more indicators within a mask field that correspond to the one or more portions of the register, the one or more indicators indicating whether the one or more portions of the register are under control of the VM or a virtual machine monitor (VMM);
  executing the command on the portion of the register if the VM has access to each of the one or more portions of the register; and
  transferring control to the VMM upon determining that the VM does not have access to at least one of the one or more portions of the register based on the corresponding indicators within the mask field.

28. The computer readable medium of claim 27 wherein the mask field includes a set of indicators, each indicator within the set of indicators corresponding to a particular portion of the register and indicating whether the particular portion of the register is allowed to be accessed by the VM.

29. The computer readable medium of claim 27 wherein each of the one or more portions of the register represents a particular bit of the register.

30. The computer readable medium of claim 27 wherein the register is a control register.

* * * * *